(12) United States Patent
Kazaryan et al.

(10) Patent No.: US 6,842,331 B1
(45) Date of Patent: Jan. 11, 2005

(54) ELECTROCHEMICAL CAPACITOR WITH A DOUBLE ELECTRIC LAYER

(75) Inventors: Samvel Kazaryan, Troitsk (RU); Sergey Razumov, Moscow (RU); Gamir Harisov, Troitsk (RU); Sergey Litvinenko, Moscow (RU)

(73) Assignee: Universal Resources AG, Zug (CH)

( * ) Notice: Subject to any disclaimer, the term of this patent is extended or adjusted under 35 U.S.C. 154(b) by 0 days.

(21) Appl. No.: 10/363,044

(22) PCT Filed: Aug. 29, 2000

(86) PCT No.: PCT/RU00/00348

§ 371 (c)(1),
(2), (4) Date: Sep. 9, 2003

(87) PCT Pub. No.: WO02/19357

PCT Pub. Date: Mar. 7, 2002

(51) Int. Cl.$^7$ ................................................ H01G 9/00
(52) U.S. Cl. ..................................... 361/502; 361/503
(58) Field of Search ............................... 361/502–510, 361/516–522

(56) References Cited

U.S. PATENT DOCUMENTS

| | | | |
|---|---|---|---|
| 3,648,126 A | | 3/1972 | Boos et al. |
| 4,957,827 A | | 9/1990 | Kordesch et al. |
| 5,986,876 A | * | 11/1999 | Stepanov et al. ........... 361/502 |
| 6,195,252 B1 | * | 2/2001 | Belyakov et al. ........... 361/502 |

FOREIGN PATENT DOCUMENTS

| | | |
|---|---|---|
| RU | 204157 C1 | 8/1995 |
| RU | 2058054 C1 | 4/1996 |
| SU | 128912 A | 3/1935 |
| WO | WO 94/01879 A1 | 1/1994 |

OTHER PUBLICATIONS

Electrochemical Energy Paper, Conference in Moscow, p. 107, 1st paragraph., 1989.

* cited by examiner

*Primary Examiner*—Dean A. Reichard
*Assistant Examiner*—Eric Thomas
(74) *Attorney, Agent, or Firm*—McDermott Will & Emery LLP

(57) ABSTRACT

The invention relates to elecrical engineering and can be used for producing electrochemical double-layer capacitors having high specific energy and power characteristics and which can store and give off energy at high speed. The essence of said invention lies in the fact that the active mass of a negative polarised electrode (2) is an organic electroconducting polymer or composite which is based on a carbon or polymer material. A separator (3) is provide with pores which enables additional oxygen molecules to penetrate. The negative polarized electrode (2) is made of a polyaniline composite and an activated carbon material or of an activated carbon material composite and polypyrrole. Aqueous solutions of non-organic acids or mixture or salts thereof or thixotropic mixtures of acids and salts or solid proton conductive compositions are used as electrolytes.

7 Claims, 4 Drawing Sheets

ELECTROCHEMICAL CAPACITOR WITH A DOUBLE ELECTRIC LAYER

FIELD OF THE INVENTION

The invention relates to the field of electrical engineering and can be used in manufacturing electrochemical capacitors having a double electric layer. The electrochemical capacitors of the present invention have high specific energy and power characteristics. The capacitors are able to store and release the electric power at a high rate.

The electrochemical capacitors can be used as:

an electrical transport power supply;

auxiliary excitation devices being a part of hybrid transport means;

a starter for internal combustion engines;

a power supply for electronic equipment of various types.

BACKGROUND OF THE INVENTION

At present is known an electrochemical capacitor with a double electric layer, including liquid electrolyte and electrodes made from various materials with a large specific surface U.S. Pat. No. [1] 4,697,224, Int. Cl. H 01 G 9/00, 1987).

Also is known an electrochemical capacitor with a double electric layer, including solid electrolyte and electrodes made from various materials with a large specific surface U.S. Pat. No. [1] 4,713,734, Int. Cl. H 01 G 9/00, 1987).

Good values of specific parameters had been obtained for a capacitor in which nickel hydroxide and activated carbon-fiber fabric had been used as positive and negative electrodes correspondingly (WO 97/07518, Int. Cl. H 01 G 9/05, 1997).

The maximum voltage of this capacitor is 1.4V, the specific capacitance and energy are, correspondingly, 46 F/sm$^3$ and 45 J/sm$^3$.

The closest analogue to the proposed one by the technical essence is an electrochemical capacitor with a double electric layer, including a housing, a positive non-polarizable and negative polarizable electrodes mounted inside it, a porous separator separating them, and an electrolyte. The active mass of the positive non-polarizable electrode comprises lead dioxide (PCT/RU 97/00353, Int. Cl. H 01 G 9/00, 1997).

The negative polarizable electrode is made from carbon material. The operation voltage range of this capacitor is 0.8 to 2.2V, the specific energy is 56.2 J/g (270 J/sm$^3$). The thickness of the separator used in the known design is no more than 150 mm.

The specific energy parameters of this capacitor are the highest in comparison with other known capacitors.

A rapid development of the technology allowed to create essentially new types of electrochemical capacitors in which new active masses are used for manufacturing electrodes, and dramatically widen the range of their application.

Despite of obtaining good results, the problem of increasing the specific energy and power characteristics of capacitors and decreasing their cost for widespread use remains actual at present.

SUMMARY OF THE INVENTION

Problems being solved by the proposed electrochemical capacitor with a double electric layer are as follows:

increasing the energy density;

increasing the specific power characteristics;

obtaining leak-proofness and absence of necessity in maintenance;

decreasing the cost of electrochemical capacitors.

The technical result in the proposed invention is achieved by creating the electrochemical capacitor with a double electric layer, including a housing, a positive non-polarizable and negative polarizable electrodes, mounted inside it, a porous separator separating them, and an electrolyte, the active mass of the positive non-polarizable electrode comprising lead dioxide, in which capacitor, according to the invention, the active mass of the negative polarizable electrode is an organic electric conductive polymer or a composite made on the base of carbon and organic polymer material, and the separator has pores providing an additional passing of the oxygen molecules.

The invention is also characterized in that the negative polarizable electrode is made from polyaniline composite and activated carbon material, or from composite of activated carbon material and polypyrrole, or from an electric conductive polymer polypyrrole.

The invention is also characterized in that the aqueous solutions of inorganic acids, or of their mixtures, or of their salts, or thixotropic mixtures of acids and salts, or solid proton-conductive compounds can be used as the electrolyte.

Although various electrolytes can be used in capacitor having said electrodes, usage of aqueous solutions of inorganic acids or their salts is preferred.

The invention is also characterized in that the electrochemical capacitor with a double electric layer is made leak-proof.

The negative electrode capacitance is a sum of two parallel processes:

a) forming of the double electric layer;

b) redox reactions.

The redox reactions, as a rule, have much lower rate of progress in comparison with a rate of charge and discharge of the double electric layer.

It is known that in activated carbon materials, the capacitance of redox reactions is 3–5 times higher than the double electric layer capacitance.

Therefore, in order to increase energy and power characteristics of the capacitors it is necessary: a) to increase the specific capacitance of the negative electrode; b) to increase the contribution of double electric layer capacitance into the whole capacitance of the negative electrode; c) to increase the rate of redox reactions.

In this invention said conditions are met due to utilizing various composites on the base of organic compounds and carbon material.

DESCRIPTION OF THE DRAWINGS

The essence of the proposed electrochemical capacitor with a double electric layer is explained by the following description of a structure of electrophysical electrode processes as well as by particular embodiments and drawings, in which.

PREFERRED EMBODIMENTS

Figure 1:
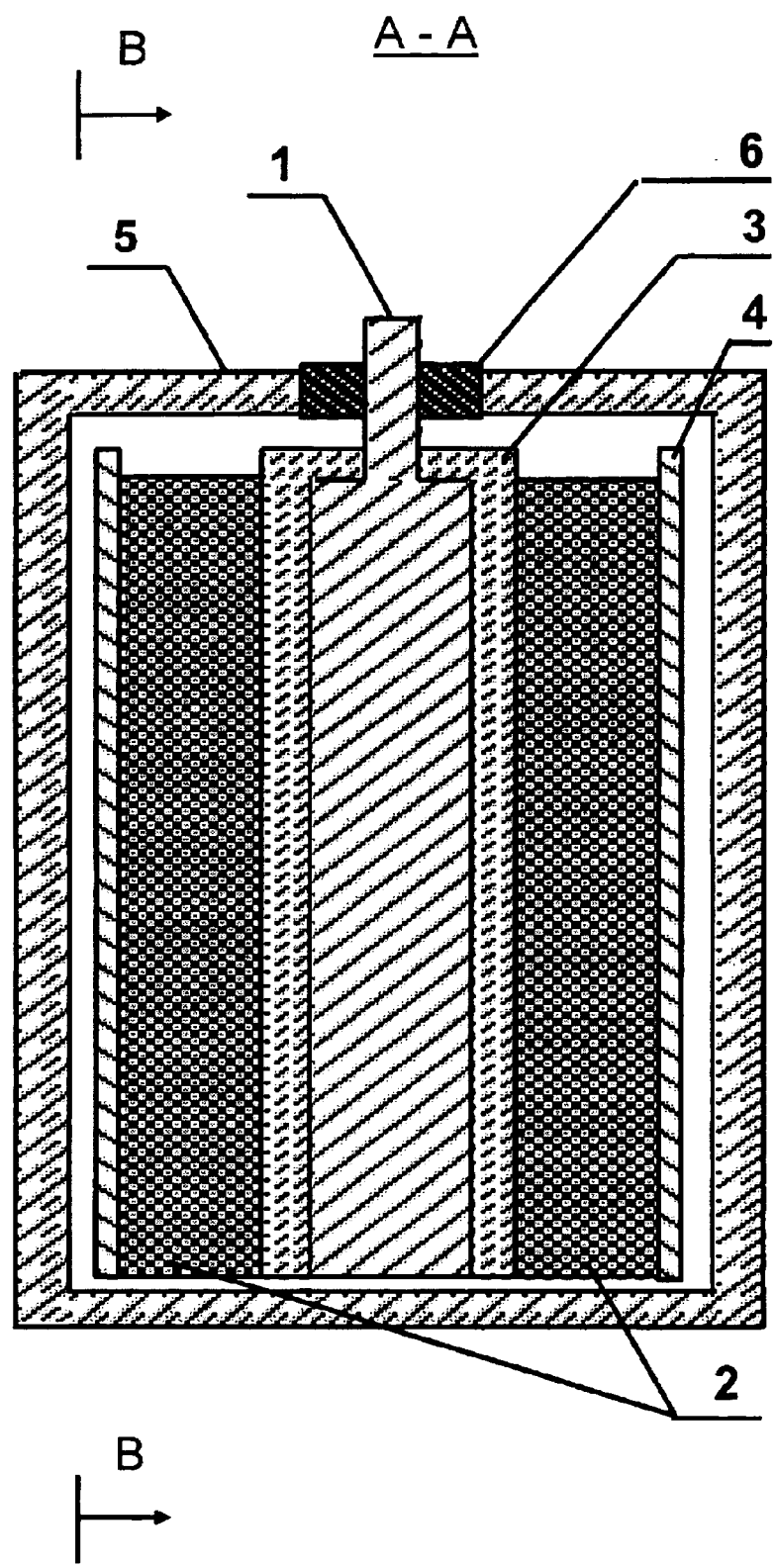
FIG. 1 shows a cross-section of the electrochemical capacitor with a double electric layer.
Figure 2:
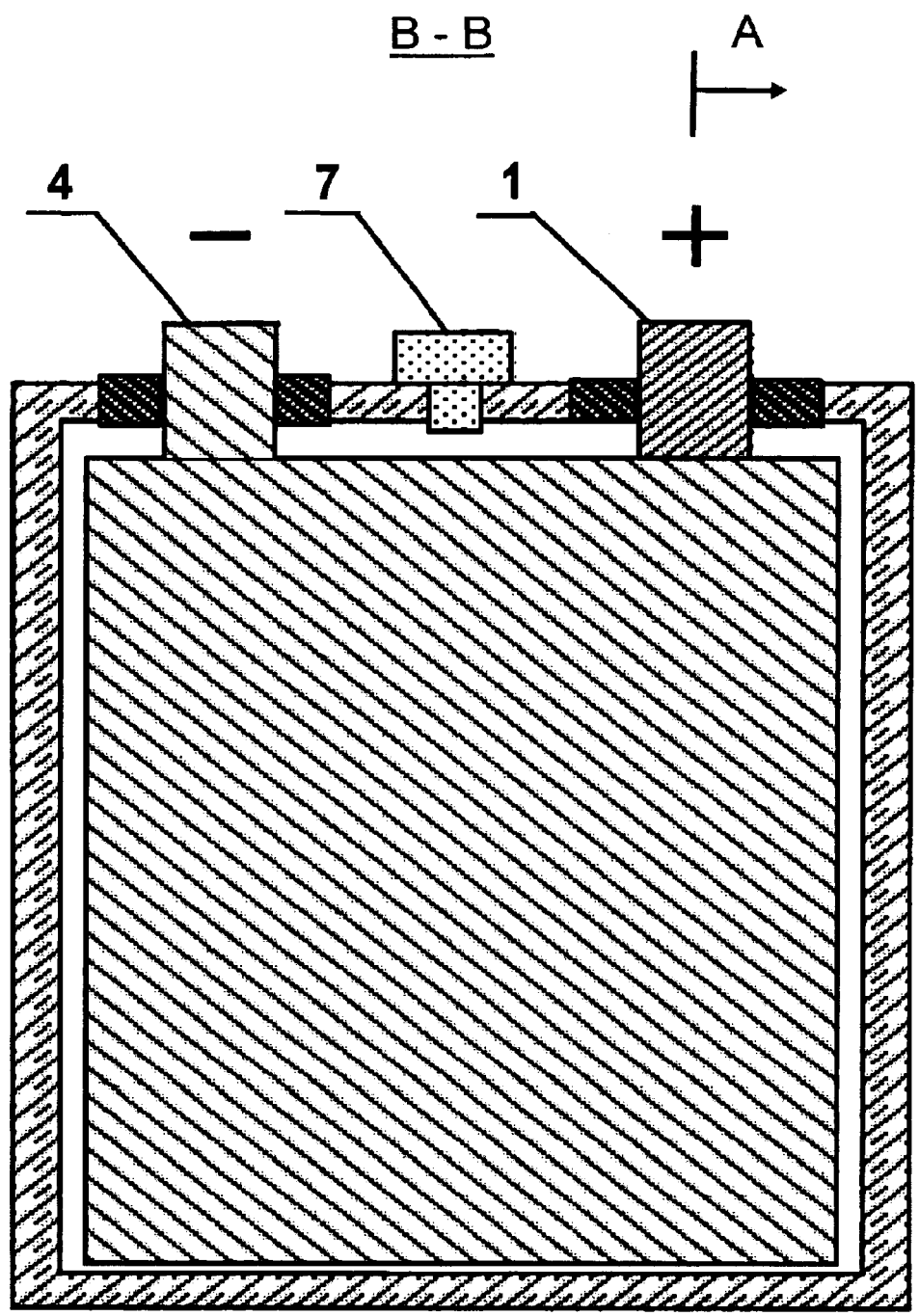
FIG. 2 shows the view A of FIG. 1.

An electrochemical capacitor with a double electric layer comprises of a positive non-polarizable electrode (1), a negative polarizable electrode (2), a separator (3), a current collector (4) of the polarizable electrode. The electrode unit is impregnated with necessary amount of electrolyte (not shown) and is placed into a housing (5) with a hermetic sealing of current leads (6). The capacitor is provided with an emergency valve (7).

An active mass of the negative polarizable electrode (2) comprises a composite including carbon or organic polymer material.

The composite materials, in contrast to carbon materials, have the capacitance of the double electric layer significantly greater than the capacitance of redox processes, and this leads to a substantial increase of specific power characteristics of the proposed capacitor.

When charging and discharging, in the negative electrode the following processes proceed:

$$H^+/e+H[S] \leftrightarrows 2H^+ + [S] + 2e, \qquad (1)$$

where H$^+$/e is the double electric layer which is formed from the protons (H$^+$) interacting by electrostatic forces with quasi-free electrons being in near-surface layers of the developed surface of the negative electrode; H[S] is redox reactions with the participation of weakly bounded or quasi-free hydrogen atom.

In the positive electrode (3), when using an aqueous solution of the sulfuric acid an the electrolyte, the following reaction proceeds:

$$PbO_2 + 4H^+ + SO_4^{2-} + 2e \leftrightarrows PbSO_4 + 2H_2O. \qquad (2)$$

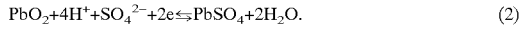

From formulae (1) and (2) it follows that free charge carriers in the positive electrode appear as a result of a phase transition of the second kind, and in the negative electrode they are in free or weakly bounded state.

Since the nature of an electrical charge origin in the positive and negative electrodes is different, then contrary to classical capacitors in which electrodes the electrical charge is in free state, the proposed capacitor is heterogeneous.

In the proposed electrochemical capacitor with a double electric layer the best results have been obtained when using the aqueous solution of the sulfuric acid having density 1.27 g/sm$^3$ as the electrolyte.

The negative electrodes (2) were manufactured from two-component composite materials of the type A$_x$ B$_{1-x}$ (where A and B are component symbols, x is the mass of the component A relative to the whole composite mass, and 1−x is the mass of the component B relative to the whole composite mass), on the base of activated carbon material (mainly in the form of carbon-fiber fabric), polyaniline, phenol, hydroquinone and polypyrrole, the value of x being changed from 0 to 1.

The obtained composite materials were subjected to polymerization by means of electrochemical treating in the concentrated sulfuric acid.

When using the aqueous solution of the sulfuric acid as the electrolyte the type of double electric layer of the negative electrode in the electrochemical capacitor (being heterogeneous) is changed during the process of charging and discharging. A potential of the positive electrode (1) of the charged capacitor is 1.7V relative to the hydrogen electrode potential, and a potential of the negative electrode (2) is minus 0.5V.

The double electric layer of the negative electrode (2) consists of protons placed on the boundary of electrolyte-negative electrode separation point, and of free electrons located in near-surface layers of the developed surface.

The voltage of an open circuit (VOC) of the charged capacitor is: $U_{VOC} = \phi^+ - \phi^- = 1,7$ V$-(-0,5V) = 2,2V$.

When discharging, free electrons of the double electric layer of the negative electrode (2) recombine with the positive charge of the PbO$_2$ electrode. This leads to an increase of the negative electrode potential and transportation of released proton into the positive electrode.

This process proceeds until the potential of the negative electrode (2) reaches the value +0.4V. After this value of the potential the double electric layer, caused by protons and electrons, fully disappears, and a new double electric layer being created by ions HSO$_4^-$ and free holes in near-surface layers of the negative electrode (2) is formed. This process proceeds up to the end of discharge.

This process, as a whole, is characterized by the following formula:

$$H^+/e + HSO_4^- \leftrightarrows H^+ + HSO_4^-/p + 2e, \qquad (3)$$

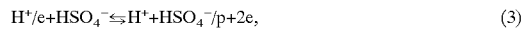

where p is the hole charge.

The advantage of the proposed capacitor is the great ability for recombining the hydrogen in the negative electrode (2), thereby it allows to make the capacitor fully leak-proof and maintenance-free.

At the end of charging or when recharging the capacitor a release of hydrogen from the positive electrode takes place, and hydrogen is not practically released from the negative electrode.

After transition of hydrogen molecules into the porous space of the negative electrode the recombination of hydrogen and protons of the double electric layer takes place with creating water, i.e., a hydrogen cycle is performed.

The hydrogen recombination rate in the negative electrode is rather high, and its value depends on hydrogen pressure in the capacitor volume. When increasing the hydrogen pressure the rate of hydrogen recombination raises significantly, thereby allowing to produce a full charging of the leak-proof capacitor in 15–20 minutes.

In order to increase the recombination rate of hydrogen being released in the positive electrode (1) when charging, the porous separator (3) is used, which separator, in addition to ions, passes the hydrogen molecules rather effectively.

In the case of the full charging of the capacitor, the redundant pressure of gases inside the housing (1) of the capacitor does not exceed 60–70 kPa, and after finishing the charge the redundant pressure substantially fully disappear during 30–40 minutes.

In the case of a continuous cycling of the present capacitor (charging is performed during 15 minutes, and discharging—30 minutes) the redundant pressure in the volume does not exceed 70 kPa.

In order to increase the hydrogen transition rate in the negative electrode (2) the electrolyte amount in the capacitor is normalized so that the significant part of large pores of the negative electrode (2), which contribution in the process of forming the electrical capacitance is small, remains not filled with the electrolyte and promotes the rapid transition of hydrogen.

EXAMPLE 1

The capacitor has been made according to the structural diagram shown in FIG. 1.

An electrode made from material containing lead dioxide ($PbO_2$) with mass 110 g and geometrical dimensions 140×80×1.6 $mm^3$ was used as the positive (non-polarizable) electrode (1) in the capacitor.

A composite material ($Pa_xCf_{1-x}$) from polyaniline and activated carbon fiber with whole mass 18 g and geometrical dimensions 140×80×1.2 $mm^3$ was used as the negative (polarizable) electrode (2). The content of polyaniline in the negative electrode (2) was 10%. The specific electrical capacitance of the negative electrode (2) had a value 1200 F/g.

The negative electrode (2) with current taps (4) from lead alloy with mass 13 g and geometrical dimensions 140×80×0.1 $mm^3$ comprises of two electrically connected parts. The negative electrode (2) (two its parts) is pressed to both surfaces of the positive electrode (1) which is placed in a pack of separator (3) having thickness 0.08 mm.

An aqueous solution of the sulfuric acid with density 1.27 $g/sm^3$ was used as the electrolyte. The electrolyte volume was 25 $sm^3$.

The electrode unit was placed into a housing (5) with sealed current leads (6).

The capacitor is provided with an emergency valve (7) which operates, i.e., releases gases from the inner volume to atmosphere in the case when the redundant pressure of gases exceeds the permissible value.

The voltage of the fully charged capacitor was equal to 2.21V. When discharging it by the 5 A direct current up to a voltage value on the capacitor equal to 0.8V, the specific yielded energy (without taking into account the housing mass) was 216 J/g (911 $J/sm^3$).

The mass and volume of the capacitor are, correspondingly, 190 g and 45 $sm^3$.

A change of the content of polyaniline in the active mass of the negative electrode (2) showed, that when increasing X from 0 to 0.1–0.15, the specific capacitance increased, and then gradually decreased, and when X was equal to 0.9, the specific energy characteristics decreased 1.3–1.4 times relative to the maximum value.

Therefore, in order to obtain the maximum specific capacitance, the optimal content of polyaniline in the composite is 10–15%.

The internal ohmic resistance of this capacitor in the beginning and at the end of discharging was equal to 8.2·$10^{-3}$ Ohm, and at the voltage 1.45V on the capacitor decreased to 7.2·$10^{-3}$ Ohm.

Figure 3:
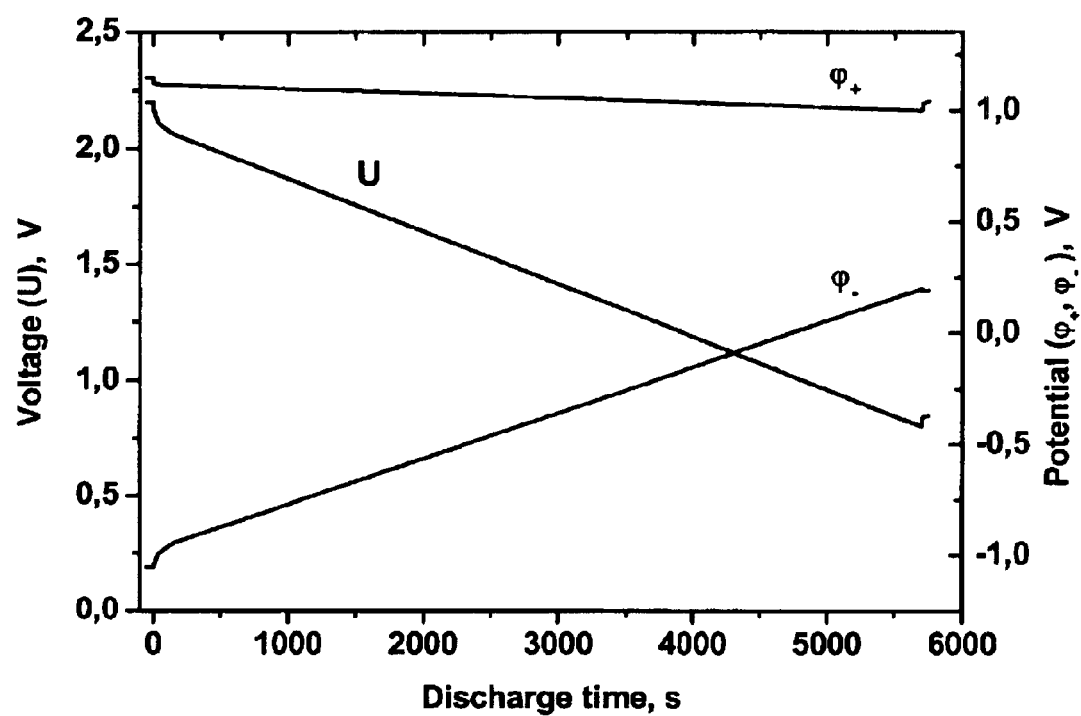
FIG. 3 shows the dependence of voltage on the capacitor (U) and potentials of positive ($\phi_+$) and negative ($\phi_-$) electrodes relative to the electrode Hg-HgSO$_4$ from the discharge time at the charge current equal to 5 A.

When discharging by direct current the potential of the negative electrode is changing substantially linearly (FIG. 3).

However, when changing X to a value lower or greater than 0.1–0.15, more rapid fall of negative electrode potential is observed at the end of discharging.

As it could be seen from this example, the specific energy of the claimed capacitor surpasses 3.8 times (by mass) and 3.37 times (by volume) the corresponding values of the closest analogue.

EXAMPLE 2

A capacitor had been manufactured with the geometrical parameters noted in Example 1. The negative electrode (2) was manufactured by means of introducing polypyrrole into the carbon-fiber fabric ($Pp_xCf_{1-x}$) with subsequent electrochemical polymerization.

The polypyrrole content in the negative electrode (2) was 18%. The mass of the composite negative electrode (2) was 21 g. The specific capacitance of the negative electrode was 1050 F/g. The aqueous solution of the sulfuric acid with density 1.27 $g/sm^3$ was used as the electrolyte.

The voltage VOC after the full charging of the present capacitor was equal to 2.09V. When discharging it by the 5 A direct current up to the voltage 0.8V, the charged capacitor yields 35,2 kj of energy. The mass and volume (without taking into account the housing mass) were equal, correspondingly, to 195 g and 46 $sm^3$.

The internal ohmic resistance of this element changes slightly from the beginning to the end of discharging and, on the average, was 9.3·$10^{-3}$ Ohm.

Changing the polypyrrole mass in the negative electrode (2) from 0 to 80% showed the following:

when increasing X from 0 to 0.2 the specific capacitance of the negative electrode raises from 620 F/g to 1050 F/g;

in subsequent increasing the polypyrrole mass the capacitance decreases to 920 F/g.

It should be noted that in order to obtain the maximum specific capacitance the optimal polypyrrole content in the composite is 20%.

EXAMPLE 3

In order to obtain a large discharge power the electrochemical capacitor with thin positive (1) and negative (2) electrodes had been manufactured.

The positive electrode (1) with the mass 17 g had geometrical parameters 140×80×0.4 $mm^3$. The active mass of the negative electrode (2) with the mass 4.7 g comprised of two parts having dimensions 140×80×0.3 $mm^3$, and it was manufactured by introducing 0.45 g of polyaniline into the matrix of carbon fiber with subsequent polymerization. The current tap (4) of the negative electrode had dimensions 140×80×0.1 $mm^3$.

The process of assembling the capacitor was performed similar to one described in Example 1.

The capacitor mass (without taking into account the housing mass) was 65 g. An aqueous solution of the sulfuric acid with density 1.27 $g/sm^3$ was used as electrolyte (6).

When discharging with the direct currents of 25 A, 60 A. and 100 A to the voltage of 0.8V the present capacitor yields, correspondingly, 6 kJ, 4.2 kJ, and 3.1 kJ of energy.

The average specific power when discharging with the 100 A direct current is 1.90 W/g. The internal ohmic resistance of the capacitor in the beginning and at the end of discharging was practically similar and equal to 5.2·$10^{-3}$ Ohm.

Figure 4:
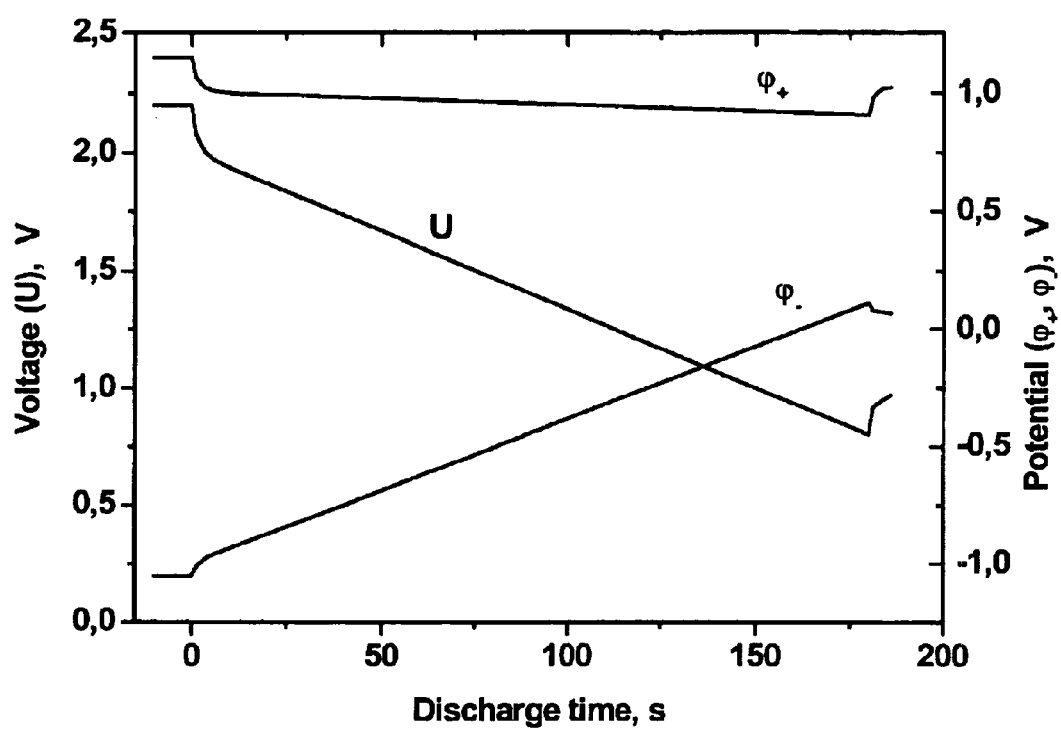
FIG. 4 shows the dependence of voltage on the capacitor (U) and potentials of positive ($\phi_+$) and negative ($\phi_-$) electrodes relative to the electrode Hg-HgSO$_4$ from the discharge time at the charge current equal to 25 A.

The voltage on the capacitor and the potentials of the positive (1) and negative (2) electrodes when discharging with direct current lower than 25 A has substantially linear dependence on the discharge time (FIG. 4).

Further increasing the discharge current led to disruption of the linear dependence of the negative electrode (2) potential and, hence, of the voltage on the capacitor.

This is substantially related with participation of redox reactions in the discharging process, a rate of which reactions is lower than the rate of discharging the double electric layer, and strongly occurs in the capacitors in which the active mass of the negative electrode consists only from carbon material.

In Example 3 it is clearly seen that the proposed capacitor is possible to provide a high discharge power, and its value will be substantially higher when improving the technology for manufacturing the electrodes.

EXAMPLE 4

The electrochemical capacitor having the negative electrode (2) from electric conductive polymer polypyrrole had been manufactured.

Preliminarily, a polypyrrole film is subjected to a long electrochemical treating in concentrated sulfuric acid. After washing and drying the electrode with geometrical dimensions 140×80×0.4 mm$^3$ and mass 3.56 g had been made.

The positive electrode (1) (having active mass PbO$_2$) had mass 18 g and dimensions 140×80×0.4 mm$^3$.

The process of assembling the capacitor was performed similarly to Example 1 (FIG. 1), and its mass was 69 g (without taking into account the housing mass).

The electrolyte was used which was the aqueous solution of the sulfuric acid with density 1.27 g/sm$^3$. Voltage on the fully charged capacitor was equal to 1,98V.

When discharging by the 0.5 A direct current up to a voltage on the capacitor equal to 0.8V, the electrical capacitance and yielded energy have values of, correspondingly, 4.6 kF and 7.41 KJ.

The internal ohmic resistance of this capacitor is 2.4 times higher than the internal ohmic resistance of the capacitor described in Example 3.

When increasing the power of discharging, a monotone decrease of yielded energy occurs, and when discharging with the 50 A current (the average specific power of the discharge is 0.78 W/g) it is equal to 2.31 kJ.

When discharge currents are higher than 12 A, a deviation from the linear dependence of a negative electrode (2) potential and, naturally, voltage on the capacitor from the discharge time occurs, and as the discharge current increases, the deviation value also increases.

It is no doubt that when improving the technology of manufacturing the negative electrodes, it will work out: to decrease the internal ohmic resistance; to increase the specific energy and power characteristics; to widen the working range of voltages.

INDUSTRIAL APPLICABILITY

Thus, aforementioned examples show that when using, in the proposed electrochemical capacitor with a double electric layer, the composite materials or electric conductive organic polymers as the active mass of the negative electrode taken in the pair with the positive electrode containing lead dioxide, its energy and power characteristics surpasses the corresponding characteristics of the closest analogue.

Apparently, the cost of the stored energy of the proposed capacitor will be substantially lower than for the closest analogue, since the cost of composite material of the negative electrode does not exceed the cost of activated carbon material, and the specific energy of the present capacitor is 3.8 times higher.

The claimed capacitor allows to perform both parallel and series connection of elements and to create on its base a capacitor batteries for various values of working voltages and capacitance.

The capacitor can have various forms and configurations of electrodes and housing. The disclosed examples only demonstrates several characteristics of the present invention and do not limit its possibilities. Introducing evident different technological changes into it will lead to improving the capacitor characteristics.

What is claimed is:

1. An electrochemical capacitor with a double electric layer, the capacitor comprising:
   a positive non-polarizable electrode,
   a negative polarizable electrode having pores, the positive and negative electrodes being within a housing,
   a porous separator separating the electrodes, pores of the separator allow passage of oxygen molecules, and
   an electrolyte,
   wherein an active mass of the positive non-polarizable electrode comprises lead dioxide,
   an active mass of the negative polarizable electrode includes an organic electric conductive polymer or a composite material based on a carbon and organic polymer material, and
   a part of the pores of the negative electrode is not filled with the electrolyte.

2. The electrochemical capacitor with a double electric layer according to claim 1, wherein the negative polarizable electrode is formed from the composite material based on the carbon and organic polymer material, wherein the organic polymer material is polyaniline, and the carbon is an activated carbon material.

3. The electrochemical capacitor with a double electric layer according to claim 1, wherein the negative electrode is formed from the composite material based on the carbon and organic polymer material, wherein the organic polymer material is polypyrrole, and the carbon is an activated carbon material.

4. The electrochemical capacitor with a double electric layer according to claim 1, wherein the negative electrode is formed from the electric conductive polymer material, wherein the electric conductive polymer material is polypyrrole.

5. The electrochemical capacitor with a double electric layer according to claim 1, wherein the electrolyte contains an aqueous solution selected from the group consisting of inorganic acids, or their mixtures, or salts.

6. The electrochemical capacitor with a double electric layer according to claim 1, wherein the electrolyte contains thixotropic mixtures of acids or salts aqueous solution.

7. The electrochemical capacitor with a double electric layer according to claims 1, wherein the electrolyte contains solid proton-conductive compounds.

* * * * *